C. LEA.
BEARING SUPPORT FOR TUBE FRAME SPOOLS.
APPLICATION FILED FEB. 8, 1915.
1,255,443.  Patented Feb. 5, 1918.
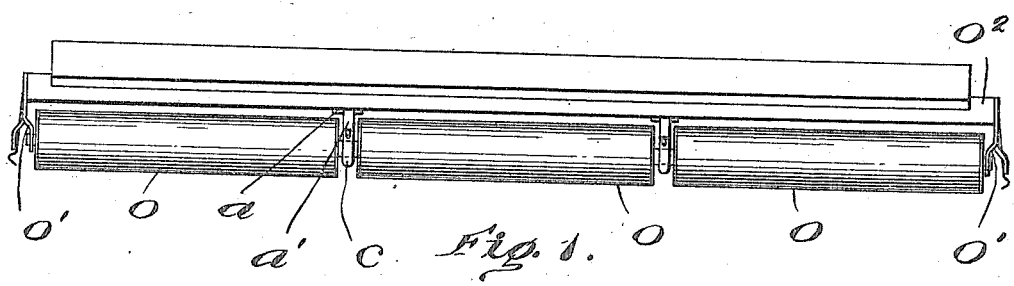
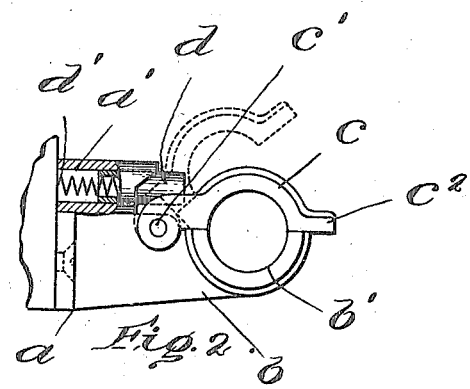
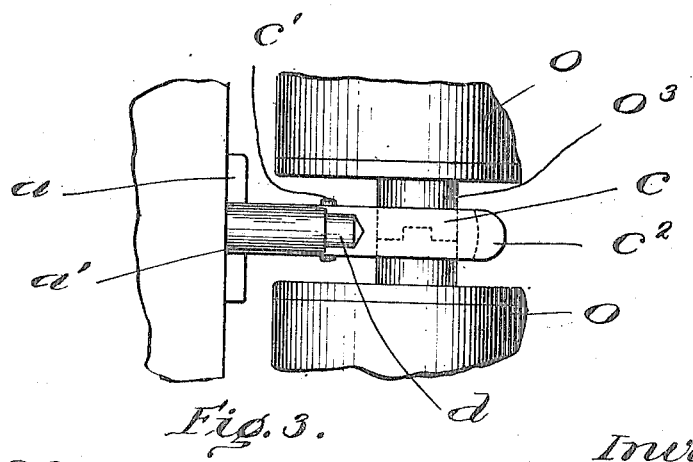
Witnesses:
Ernest A. Telfer
Eloise Lawrence
Inventor:
Charles Lea
Geo. N. Goddard
Atty.

UNITED STATES PATENT OFFICE.

CHARLES LEA, OF DORCHESTER, MASSACHUSETTS.

BEARING-SUPPORT FOR TUBE-FRAME SPOOLS.

1,255,443.     Specification of Letters Patent.     Patented Feb. 5, 1918.

Application filed February 8, 1915. Serial No. 6,904.

*To all whom it may concern:*

Be it known that I, CHARLES LEA, citizen of the United States, and resident of Dorchester, Massachusetts, have invented certain new and useful Improvements in Bearing-Supports for Tube-Frame Spools, of which the following is a specification.

This invention has relation to the bearing support for tube frame spools or the like, and is intended to provide a means for positively holding the journals of the spools in operative position while providing a construction by which the spools may be quickly and easily removed from operative position and new spools substituted without inconvenience or loss of time.

To this end the invention comprises a support or bracket consisting of two separate members having approximately semi-circular bearing recesses arranged to register in position to form a complete bearing for the supported journals when closed and capable of opening to allow the removal of the journals, the support being provided with self-acting locking means for securely locking the members together in closed position and arranged so as to be instantly removed from locking position, as will be hereinafter explained.

In the accompanying drawings I have illustrated one of the forms of embodying the principle of this invention, in which Figure 1 is a plan view of the tube frame illustrating the use of this invention for detachably supporting intermediate journals of the yarn spools.

Fig. 2 is a side elevation, partly broken away, showing the details of construction of the bracket bearing support.

Fig. 3 is a plan view of the same on a somewhat larger scale, showing the abutting ends of the journals of adjacent spools mounted in operative position in the bearing bracket.

In practice, the tube frames for wide looms, instead of carrying a single yarn spool running the entire length of the tube frame, as in the case of narrow looms, carry a series of spools arranged co-axially, end to end, like the spools 0 mounted in plane $0^2$, as shown in Fig. 1. The end bearing brackets $0'$ are of the same type as those used where a one-piece spool is employed, but the intermediate brackets for supporting the intermediate journals are usually made in upper and lower separable bearing sections forming split bearing boxes, the caps or upper members of which are held in place by a fastening screw. As will be understood, these yarn spools are removed as soon as the yarn supply thereon is exhausted and are replaced by new spools so that the bearings have to be frequently removed and replaced.

To avoid inconvenience and delay, I have devised a construction of bearing bracket or journal support which is automatically and positively locked when in closed position, and which is capable of being instantly opened to release the inclosed journal.

In the form of the invention shown, bearing bracket $a$ is formed with a lower member $b$ having a semicircular bearing recess $b'$, and to the member $b$ is hingedly connected the cap member $c$ provided also with a semicircular recess and pivoted at $c'$ to register with and form in connection with the lower bearing member $a$ complete but separable bearing for retaining the journals $0^3$ of the yarn spools 0. At its forward end, the member $c$ is provided with a projecting lip $c^2$ to be readily engaged by the finger of the attendant so as to facilitate the raising or opening of the upper member to permit the removal or replacement of the journal.

At any suitable location, in this case, directly behind the member $c$, is mounted a detent which in this case is in the form of a slide or plunger $d$ seated in the tubular socket member $a'$ and normally pressed forward by a compression spring $d'$ so as to overhang and engage the rear part of the member $c$. The plunger in advanced position preferably extends beyond or in front of the pivotal axis.

To open the bearing, the operator simply presses back the plunger $d$ with his thumb or finger and at the same time lifts the upper jaw of member $c$ of the bearing which will then remain in the position indicated in dotted lines in Fig. 2. When the new spools are placed in the bearings, the attendant merely depresses the movable member $c$ to closed position where it is locked automatically by the advance of the pin $d$ and the pressure on the spring $d'$.

It will, therefore, be seen that no time is lost in disengaging or separating the bearing members and by no possibility can the split bearing work loose by the jarring of a fastening screw, which is a very important consideration, since these bearing brackets must be made very narrow on account of the limited space available and the dropping out of the spool would occasion much trouble to the weaver and damage the fabric.

What I claim is:

1. A bearing bracket for a tuft spool or other journal embracing upper and lower bearing members formed with registering semicircular bearing faces to form seats for the journal, one of said members being pivotally connected with the other about a pivotal axis substantially parallel to the journal axis to permit the opening and closing of the bearing, and locking means automatically movable in position to positively lock the two members together when the bearing is closed, substantially as described.

2. A bearing bracket or support for a rotatable journal comprising upper and lower bearing jaws, one of which is movable in relation to the other in a plane at right angles to the journal axis from open to closed position, and a separate locking detent automatically movable into positive locking engagement with the movable member when it is in closed position, said locking member being movable into inoperative position in order to release the movable bearing member, substantially as described.

3. A supporting bearing bracket comprising upper and lower semicircular jaws arranged to form a complete bearing inclosing a supported journal, one of said bearing members being pivotally connected with the other, a detent movable into position to positively lock the two members in closed position, and a spring for moving said detent into locking position while permitting it to be released therefrom by pressure in the opposite direction, substantially as described.

4. A bearing bracket embracing a lower jaw or member provided with a semicircular bearing seat, a pivotally connected upper member provided with a corresponding semicircular bearing seat and having a projecting lug or lip for engagement by the attendant, a spring pressed plunger mounted in a socket above the pivotal axis and automatically movable into a position forward of said axis to firmly lock the pivoted member in closed relationship to the fixed member, substantially as described.

5. A bearing bracket for a tuft-spool journal embracing a pair of opposed bearing members each provided with coöperating bearing recesses to form an encircling support for the journal, one of said members being movable in relation to the other in a plane substantially at right angles to the axis of the journal, and an interlocking detent movable in a direction transverse to said journal to interlock said members in operative relationship by a quick detachable engagement which permits their separation substantially as described.

6. A bearing bracket for a tuft-spool journal, embracing a pair of opposed bearing members provided with coöperating bearing recesses to form an encircling support for the journal, one of said members being swingable in relation to the other about the axis, substantially parallel with the axis of the journal, and a spring actuated detent arranged to move transversely of said pivotal axis into position to lock said swingable member into close relationship with the coöperating member, substantially as described.

CHARLES LEA.

In the presence of—
GEO. N. GODDARD,
GEORGE A. ROCKWELL.

Copies of this patent may be obtained for five cents each, by addressing the "Commissioner of Patents, Washington, D. C."